2,775,616
Patented Dec. 25, 1956

2,775,616

PREPARATION OF METHIONINE FROM α-AMINO-γ-METHYLTHIOBUTYRONITRILE

David Oliver Holland, Dorking, England, assignor to Beecham Research Laboratories Limited, Betchworth, England, a company of Great Britain No Drawing. Application December 15, 1952, Serial No. 326,170

Claims priority, application Great Britain December 21, 1951

7 Claims. (Cl. 260—534)

This invention is an improved process for the preparation of methionine which is known to be a vital factor in human and animal foodstuffs and which has a therapeutic value in the case, for example, of certain liver diseases.

It has previously been suggested to prepare methionine by hydrolysis of methionine nitrile (α-amino-γ-methylthiobutyronitrile) or a hydrochloride or oxalate thereof.

There has, however, been the disadvantage that poor or moderate yields of methionine were obtained and/or that the product contained certain tarry impurities necessitating complicated and expensive purification processes. These tarry impurities are formed during acid hydrolysis from the by-products present in the crude methionine nitrile.

It is the object of the present invention to provide a process for the preparation of methionine from crude methionine nitrile giving better yields of a purer product.

The process according to the invention comprises reacting upon a solution of crude methionine nitrile, in an organic solvent, with phosphoric acid or sulphuric acid so as to precipitate the corresponding phosphate or sulphate, and then removing and hydrolysing the salt.

There are various solvents which may be used and which allow only the methionine nitrile phosphate or sulphate to precipitate whereby the salt is separated from the by-products which give rise to the tarry impurities, thus enabling substantially pure methionine to be obtained. Thus the lower aliphatic alcohols, such as ethanol, isopropanol and n-butanol may be used. Methanol is satisfactory in the case where the methionine nitrile sulphate is produced but not in the case where the phosphate is produced because the latter is readily soluble in methanol. In this case, however, a suitable solvent comprises methanol together with a limited amount of solvent, such as ether, in which the phosphate is only sparingly soluble. A suitable proportion is a volume of ether equal to the volume of methanol.

Other suitable solvents are monoalkyl ethers of simple glycols, e. g. β-ethoxyethanol. Acetone is also satisfactory, but not its homologues. It will be understood that mixtures of any of the aforesaid suitable solvents may be employed.

The invention is illustrated in the following examples:

Example 1

To a solution of 5 g. of crude methionine nitrile in 30 ml. of dry ethanol there is added dropwise with stirring and cooling to room temperature 1.05 ml. of concentrated sulphuric acid. Methionine nitrile sulphate precipitates as a cream coloured powder of melting point 175° C. (with decomposition). The mixture is stored for a few hours in a refrigerator and the precipitate is then filtered off, washed first with about 20 ml. of ethanol and then with ether, and dried. The yield is about 75%.

The sulphate is hydrolysed by heating under reflux for 1.5 hours with a mixture of 4.3 g. concentrated sulphuric acid and 5.5 ml. water. The resulting solution is cooled to room temperature, diluted with a little water and neutralized to pH 6 with ammonium hydroxide, whereupon methionine separates as a buff coloured powder. This is filtered off and washed with a little cold water. Small second crops may be obtained from the mother liquors by concentration and refrigeration. The methionine so obtained is readily purified by recrystallisation from water using a very small quantity of absorbent charcoal for the removal of final traces of coloured impurities.

Example 2

To a solution of 5 g. of crude methionine nitrile in 30 ml. of ethanol, 2.45 ml. of phosphoric acid (d. 1.75) is added dropwise. Methionine nitrile dihydrogen phosphate precipitates as a white powder of melting point 118–119° C. The mixture is stored for a few hours in a refrigerator and the precipitate is then filtered off, washed firstly with about 20 ml. of ethanol and then with ether, and dried. The yield of the phosphate is 90%.

The phosphate is hydrolysed by heating under reflux for 1.5 hours with a mixture of 6 g. concentrated sulphuric acid and 6 ml. water. From the resulting solution methionine is obtained by the working up procedure described in Example 1.

Further experiments have shown that if Example 1 is repeated using methanol instead of ethanol the sulphate is obtained as a white powder of melting point 179° C. (with decomposition); using isopropanol the sulphate is a cream coloured powder of melting point 175–176° C. (decomp.); using n-butanol the sulphate is a cream coloured powder of melting point 176° C. (decomp.); using acetone the sulphate is a white powder of melting point 176° C. (decomp.); and using β-ethoxyethanol the sulphate is a white solid of melting point 174° C. (decomp.). By contrast if methylethylketone, ethyl acetate or dioxan is used as the solvent in carrying out the procedure of Example 1 there is obtained a discoloured and tarry product of melting point 170° C. (decomp.) which is unsatisfactory for hydrolysing to produce methionine of good purity.

When the procedure of Example 2 was varied by using other solvents in place of ethanol the results were found to be as follows:

With a mixture of methanol and ether (1:1 by volume), the phosphate is obtained as colourless crystals of melting point 115–117° C.; with isopropanol the phosphate is obtained as a cream coloured powder of melting point 111–114° C.; with n-butanol the phosphate is obtained as a cream coloured powder of melting point 111–113° C.; with β-ethoxyethanol the phosphate is obtained as colourless crystals of melting point 113–114° C.; and with acetone the phosphate is obtained as a white powder of melting point 118–119° C. (It should be noted that when using isopropanol, n-butanol or acetone as the solvent the phosphate separated initially as an oil or gum which crystalised on rubbing.)

By contrast if in carrying out the procedure of Example 2 there is employed as solvent methanol plus ether (1:4 by volume), methylethylketone, ethyl acetate or dioxan, a much discoloured and/or sticky product is produced which is unsatisfactory for hydrolysis to produce methionine of good purity.

I claim:

1. In the manufacture of methionine by hydrolysis of crude methionine nitrile which contains by-products which yield tarry matter on hydrolysis, the process of reacting upon a solution of the nitrile in an organic solvent with a mineral acid selected from the group consisting of phosphoric acid and sulphuric acid so as to precipitate the corresponding salt and then removing and hydrolysing the salt, the solvent being selected from the group consisting of lower alkyl alcohols, lower alkyl mono ethers of a polymethylene glycol, and acetone such that the nitrile salt is substantially insoluble and the by-products substantially soluble therein.

2. Process as claimed in claim 1, wherein the solvent is the lower alkyl monoether of a polymethylene glycol.

3. Process as claimed in claim 1, wherein the solvent is β-ethoxyethanol.

4. Process as claimed in claim 1, wherein the solvent is acetone.

5. Process as claimed in claim 1, wherein the mineral acid is sulphuric acid and the solvent is a lower aliphatic alcohol containing 1 to 4 carbon atoms.

6. Process as claimed in claim 1, wherein the mineral acid is phosphoric acid and the solvent is a lower aliphatic alcohol containing 2 to 4 carbon atoms.

7. Process as claimed in claim 1, wherein the mineral acid is phosphoric acid and the solvent is a mixture of methanol and diethyl ether in equal parts by volume.

References Cited in the file of this patent
UNITED STATES PATENTS

| | | |
|---|---|---|
| 2,504,425 | Kralovec | Apr. 18, 1950 |
| 2,552,026 | Bauer et al. | Mar. 8, 1951 |
| 2,564,105 | Gresham et al. | Aug. 14, 1951 |